(12) United States Patent
Ujiie et al.

(10) Patent No.: US 11,347,333 B2
(45) Date of Patent: May 31, 2022

(54) ROTATION DETECTION DEVICE AND ROTATION DETECTION METHOD

(71) Applicant: MITSUBISHI ELECTRIC CORPORATION, Tokyo (JP)

(72) Inventors: Junya Ujiie, Tokyo (JP); Jumpei Yamasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/048,934

(22) PCT Filed: Jul. 5, 2018

(86) PCT No.: PCT/JP2018/025457
§ 371 (c)(1),
(2) Date: Oct. 19, 2020

(87) PCT Pub. No.: WO2020/008584
PCT Pub. Date: Jan. 9, 2020

(65) Prior Publication Data
US 2021/0149507 A1 May 20, 2021

(51) Int. Cl.
*G06F 3/041* (2006.01)
*G06F 3/0362* (2013.01)

(52) U.S. Cl.
CPC ............ *G06F 3/041* (2013.01); *G06F 3/0362* (2013.01)

(58) Field of Classification Search
CPC .... G06F 3/0362; G06F 3/0312; G06F 3/0346; G06F 3/041
See application file for complete search history.

(56) References Cited

U.S. PATENT DOCUMENTS

2014/0042004 A1\* 2/2014 Tseng .................... G06F 3/0362
200/336
2014/0350784 A1\* 11/2014 Imai ........................ G06F 3/041
701/36

FOREIGN PATENT DOCUMENTS

JP 2016-45525 A 4/2016
JP 2016-206930 A 12/2016

\* cited by examiner

*Primary Examiner* — Hang Lin
(74) *Attorney, Agent, or Firm* — Birch, Stewart, Kolasch & Birch, LLP (57) ABSTRACT

An object is to provide a technique capable of improving detection accuracy for the rotation of the knob. A rotation detection device includes a position detection unit that detects positions of a plurality of detection points on a touch panel, a rotation detection unit that detects rotation of a knob based on the positions of the plurality of detection points, a the complement unit that complements positions of the rest of the detection points used for detection of the rotation detection unit based on the positions of some of the detection points and a predetermined position of the rotation axis when only the positions of some of the detection points among the plurality of detection points are detected.

10 Claims, 10 Drawing Sheets

ROTATION DETECTION DEVICE AND ROTATION DETECTION METHOD

TECHNICAL FIELD

The present invention relates to a rotation detection device and a rotation detection method.

BACKGROUND ART

In recent years, various techniques have been proposed for display devices with a touch panel. For example, a display device with a touch panel has been proposed in which a knob as a physical rotary operator is disposed so that the direct rotating operation on the display screen can be performed.

The knob has a conductive contact portion such as a terminal as a detection point, and the touch panel is capable of detecting the position of the detection point in the same manner as the detection of the touch position in the touch operation. As a result, the touch panel is capable of detecting the rotation of the detection point as a rotating operation on the knob.

However, there has been a problem in that, if the knob is provided with a single detection point and the single detection point is not detected for some reason during the rotating operation, the rotation of the knob is failed to be detected. As a technique for solving the problem, Patent Documents 1 and 2 propose a knob provided with a plurality of detection points.

PRIOR ART DOCUMENTS

Patent Documents

[Patent Document 1] Japanese Patent Application Laid-Open No. 2016-45525
[Patent Document 2] Japanese Patent Application Laid-Open No. 2016-206930

SUMMARY

Problem to be Solved by the Invention

However, there has been a problem that, in the technique of detecting the positions of a plurality of detection points, the rotation of the knob cannot be detected accurately when only the positions of some of the detection points are detected.

The present invention has been made in view of the above problem and has an object to provide a technique capable of improving detection accuracy for the rotation of the knob.

Means to Solve the Problem

According to the present invention, a rotation detection device is a rotation detection device configured to detect rotation of a knob rotatable about a rotation axis, in which the knob includes a plurality of detection points separated from the rotation axis, and the knob is capable of being disposed with the rotation axis positioned at a predetermined position on the touch panel, and the rotation detection device includes the position detection unit that detects the positions of the plurality of detection points on the touch panel, the rotation detection unit that detects the rotation of the knob based on the positions of the plurality of detection points detected by the position detection unit, and the complement unit that complements the positions of the rest of the detection points used for detection of the rotation detection unit based on the positions of some of the detection points and the predetermined position of the rotation axis when the position detection unit detects only the positions of some of the detection points among the plurality of detection points.

Effects of the Invention

According to the present invention, the positions of the rest of the detection points used for the detection of the rotation of the knob are complemented based on the positions of some of the detection points and the predetermined position of the rotation axis when only the positions of some of the detection points among the plurality of detection points are detected. With such a configuration, the detection accuracy of the rotation of the knob is enhanced.

The explicit purpose, feature, phase, and advantage of the present invention will be described in detail hereunder with attached drawings.

DESCRIPTION OF EMBODIMENTS

Embodiment 1

Figure 1:
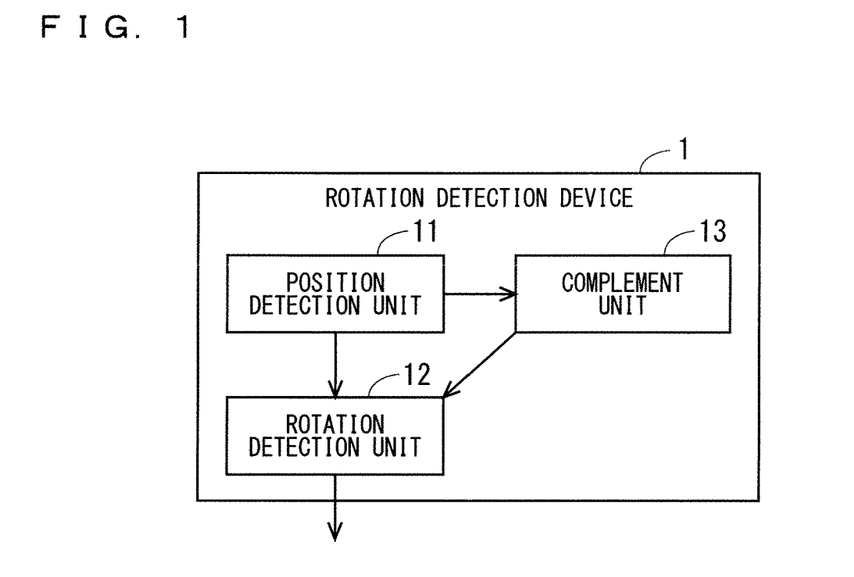
FIG. 1 A block diagram illustrating a configuration of a rotation detection device according to Embodiment 1.
Figure 2:
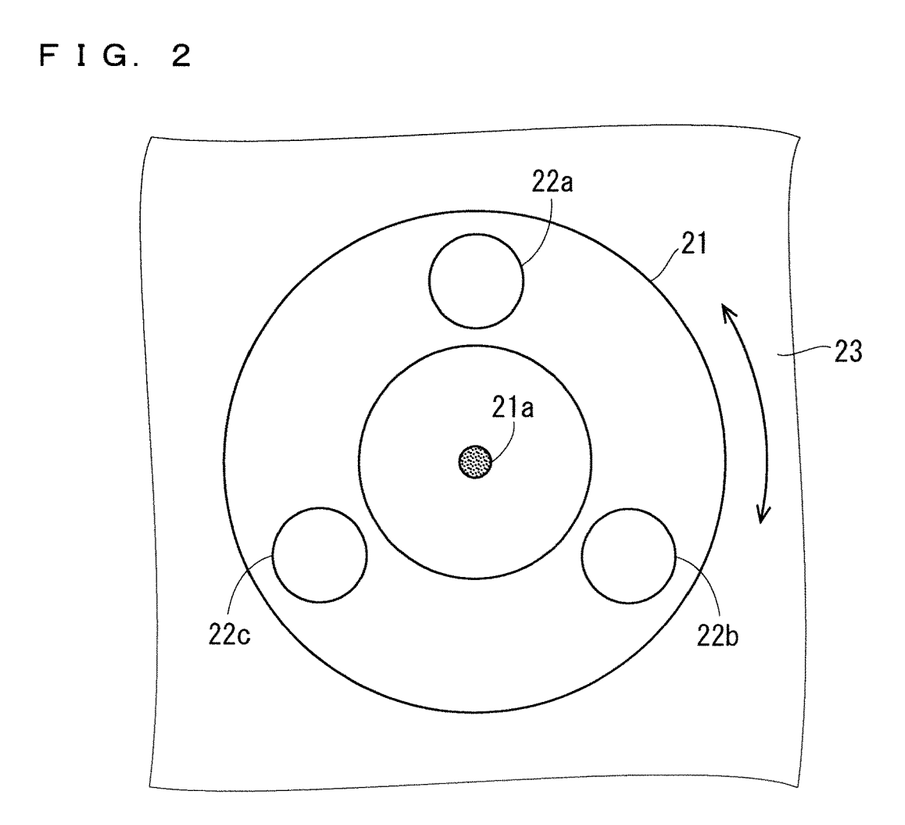
FIG. 2 A plan view illustrating a configuration of a knob according to Embodiment 1.

FIG. 1 is a block diagram illustrating a configuration of a rotation detection device 1 according to Embodiment 1 and FIG. 2 is a plan view illustrating a configuration of a knob 21 according to Embodiment 1 of the present invention. The knob 21 is rotatable about a rotation axis 21a, and the rotation detection device 1 detects the rotation of the knob 21. Hereinafter, detection of rotation of the knob 21 in the rotation detection device 1 will be described.

The knob 21 includes a plurality of detection points 22 separated from the rotation axis 21a. In the example of FIG. 2, the knob 21 includes three detection points 22 (detection points 22a, 22b, 22c) arranged concentrically on the rotation axis 21a at equal intervals. Each detection point 22 is, for example, a conductive contact portion such as a terminal.

The knob 21 can be disposed with the rotation axis 21a positioned at a predetermined position on the touch panel 23, and is attachable to and detachable from the touch panel 23, for example. The knob 21 projects from the touch panel 23 when disposed on the touch panel 23.

The touch panel 23 is capable of detecting the positions of the plurality of detection points 22 in the same manner as the detection of the touch position in the touch operation. Accordingly, the touch panel 23 is capable of detecting the rotation of the plurality of detection points 22 as a rotation operation on the knob 21 for changing the volume and the like. The touch panel 23 is, for example, a capacitance type touch panel.

The rotation detection device in FIG. 1 includes a position detection unit 11, a rotation detection unit 12, and a complement unit 13.

The position detection unit 11 in FIG. 1 detects the positions of a plurality of detection points 22 on the touch panel 23 at any time. The position detection unit 11 may be provided on the touch panel 23 or may be provided outside the touch panel 23.

The rotation detection unit 12 detects the rotation of the knob 21 based on the positions of the plurality of detection points 22 detected by the position detection unit 11. Detection of the knob 21 by the rotation detection unit 12 includes detection of at least one of the rotation direction and the rotation angle of the knob 21.

When the position detection unit 11 detects only the positions of some of the detection points 22 among the plurality of detection points 22, the complement unit 13 complements the positions of the rest of the detection points 22 used for the detection of the rotation detection unit 12 based on the positions of some of the detection points 22 and the predetermined position of the rotation axis 21a.

Figure 3:
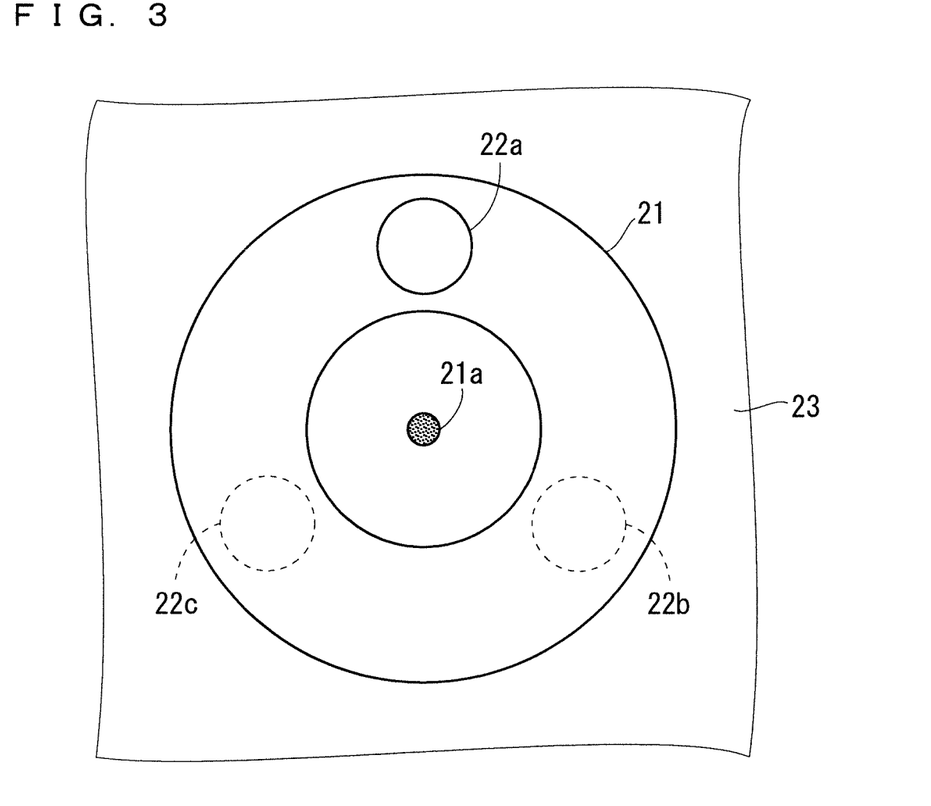
FIG. 3 A plan view for illustrating the complementation of the rotation detection device according to Embodiment 1.

FIG. 3 is a plan view for illustrating the complementation by the complement unit 13. In FIG. 3, the detected detection points 22 are shown by solid line, and the undetected detection points 22 are shown by broken line. That is, FIG. 3 illustrates a state in which only the position of the detection point 22a is detected by the position detection unit 11 among the detection points 22a to 22c in FIG. 2.

In this case, in accordance with a predetermined positional relationship between the rotation axis 21a and the detection points 22a to 22c, the complement unit 13 complements the detection points 22b and 22c based on the position of the rotation axis 21a and the position of the detection point 22a. Then, the rotation detection unit 12 detects the rotation of the knob 21 based on the position of the detection point 22a detected by the position detection unit 11 and the positions of the detection points 22b and 22c complemented by the complement unit 13. Note that specific detection by the rotation detection unit 12 will be described in detail from Embodiment 2 onward.

Conclusion of Embodiment 1

According to the above rotation detection device 1 of Embodiment 1, when only the positions of some of the detection points 22 among the plurality of detection points 22 are detected, the positions of the rest of the detection points 22 used to detect the rotation of the knob 21 are complemented based on the positions of some of the detection points 22 and the position of the rotation axis 21a. With such a configuration, a state similar to the state in which the positions of all the detection points 22 are detected by the position detection unit 11 is obtained; therefore, the detection accuracy of the rotation of the knob 21 is enhanced.

Embodiment 2

Figure 4:
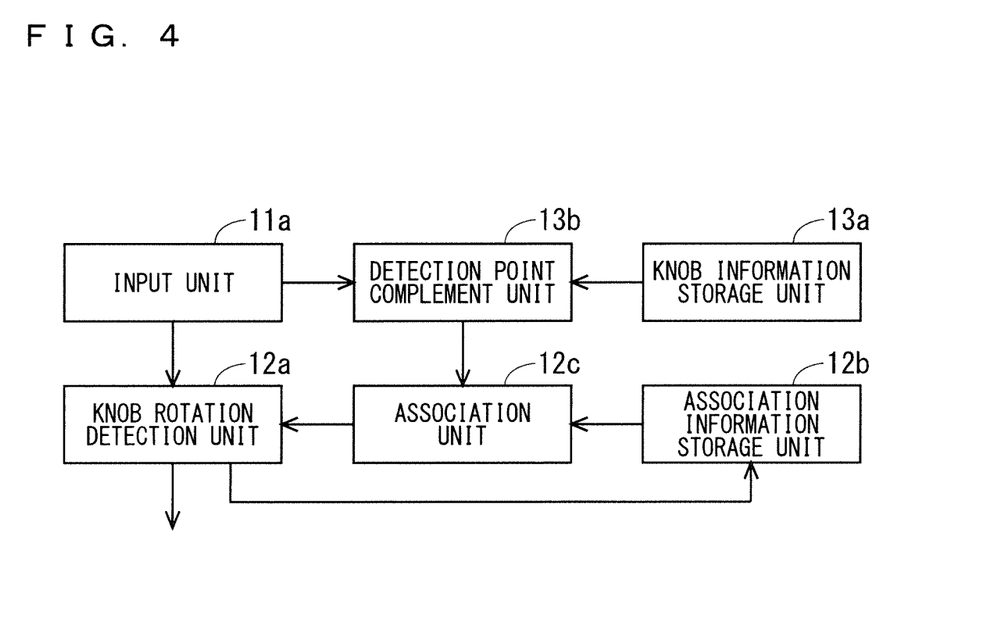
FIG. 4 A block diagram illustrating a configuration of a rotation detection device according to Embodiment 2.

FIG. 4 is a block diagram illustrating a configuration of a rotation detection device 1 according to Embodiment 2 of the present invention. Hereinafter, of the components according to Embodiment 2, the same or similar reference numerals are given to the same or similar components as those described above, and different components will be mainly described.

The rotation detection device 1 of FIG. 4 includes an input unit 11a, a knob rotation detection unit 12a, an association information storage unit 12b, an association unit 12c, a knob information storage unit 13a, and a detection point complement unit 13b. The input unit 11a corresponds to the position detection unit 11 in FIG. 1. The knob rotation detection unit 12a, the association information storage unit 12b, and the association unit 12c correspond to the rotation detection unit 12 in FIG. 1. The knob information storage unit 13a and the detection point complement unit 13b correspond to the complement unit 13 in FIG. 1.

As is the same with the position detection unit 11 of Embodiment 1, the input unit 11a detects the positions (coordinates) of the plurality of detection points 22 on the touch panel 23 at any time. It should be noted that the input unit 11a provides each of the plurality of detected detection points 22 with an identifier different from one another for identifying each of the plurality of detection points 22. The identifier is used by the knob rotation detection unit 12a and the like.

The knob rotation detection unit 12a obtains a movement amount of the detection point 22 for each identifier. In Embodiment 2, the knob rotation detection unit 12a obtains a difference between the positions of the plurality of detection points 22 currently detected by the input unit 11a and the positions of the plurality of detection points 22 previously detected by the input unit 11a, respectively, for each identifier. Then, the knob rotation detection unit 12a detects the rotation of the knob 21 based on the obtained differences.

Here, a rotation detection device related to the rotation detection device 1 according to Embodiment 2 (hereinafter referred to as "related rotation detection device") will be described.

Figure 5:
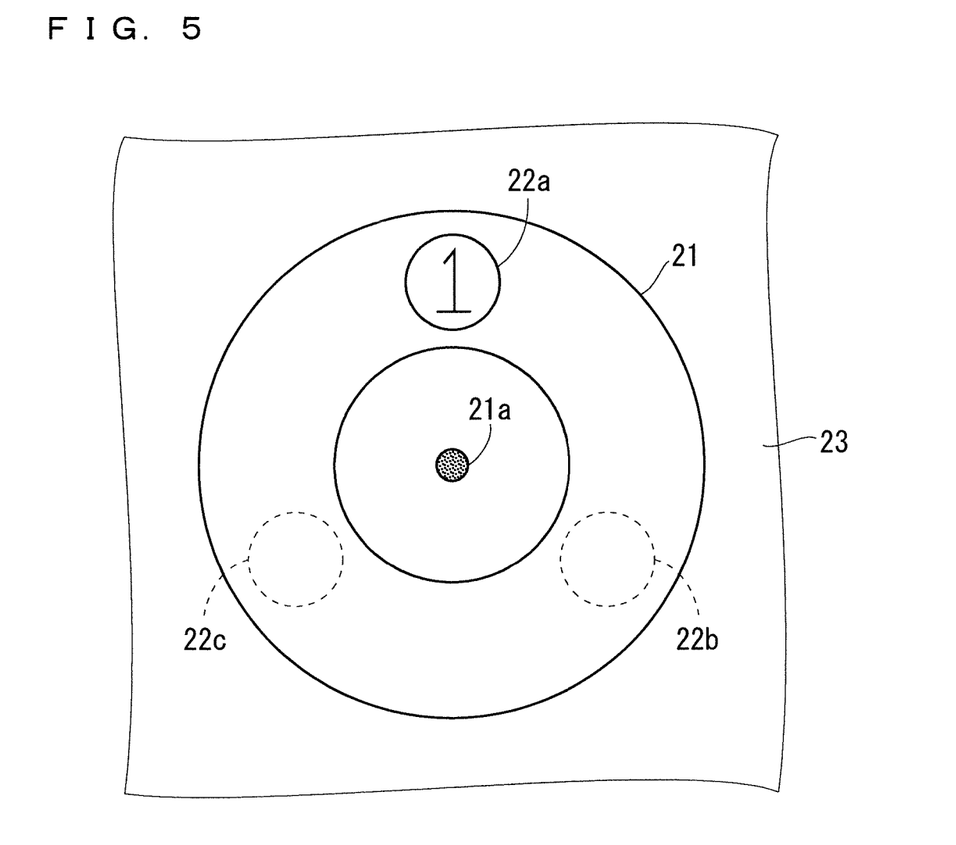
FIG. 5 A plan view for illustrating a problem in a related rotation detection device.
Figure 6:
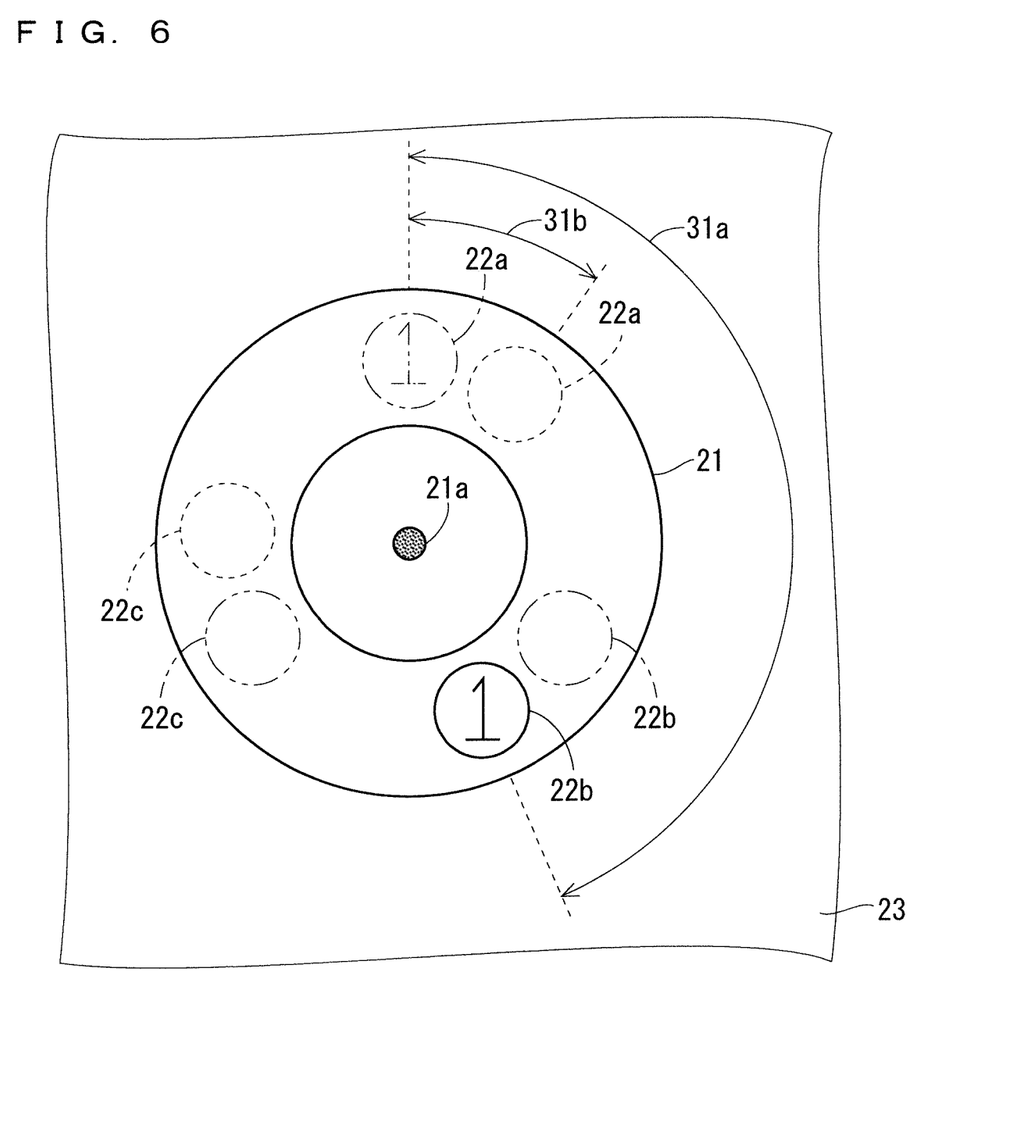
FIG. 6 A plan view for illustrating the problem in the related rotation detection device.

FIGS. 5 and 6 are plan views for illustrating the problem in the related rotation detection device. In FIGS. 5 and 6, the currently detected detection point 22 is shown by solid line, the currently undetected detection points 22 is shown by broken line, and the previously detected detection point is shown by chain double-dashed line. In the description here, when none of the detection points 22 were detected, the input unit 11a of the related rotation detection device resets the identifiers of all detection points to "1", "2" and "3" in this order one by one in clockwise from the detection point detected for the first time since then.

In the state of FIG. 5, the detection point 22a assigned with the identifier "1" is detected by the input unit 11a. It is assumed here that none of the detection points 22a to 22c are detected by the input unit 11a during the transition period from the state of FIG. 5 to the state of FIG. 6 by the rotation operation. In this case, the input unit 11a provides the detection point 22b which is detected in the state of FIG. 6 with the identifier "1". Then, the knob rotation detection unit 12a obtains a difference between the previously detected position of the detection point 22a assigned with the identifier "1" and the currently detected position of the detection point 22b assigned with the identifier "1".

Therefore, this leads to a problem in which a rotation angle 31a detected by the related rotation detection device becomes larger than an actual rotation angle 31b as illustrated in FIG. 6. Although not illustrated, contrary to the above description, it can happen that the rotation angle 31a detected by the knob rotation detection unit 12a becomes smaller than the actual rotation angle 31b, and even a rotational failure in which rotation is not detected can happen despite the operation on the knob 21 being performed. On the other hand, as will be apparent from the following description, the rotation detecting device 1 according to Embodiment 2 is capable of solving the above problems.

Hereinafter, the description will be returned to the rotation detection device 1 according to Embodiment 2 illustrated in FIG. 4.

Information about the knob 21 is stored in the knob information storage unit 13a. The information about the knob 21 includes, for example, the number of the plurality of detection points 22 and a predetermined positional relationship between the rotation axis 21a of the knob 21 and the plurality of detection points 22.

As is the same with the complementation described in Embodiment 1, when only the positions of some of the detection points 22 are detected by the input unit 11a, in accordance with the positional relationship stored in the knob information storage unit 13a, the detection point complement unit 13b complements the positions of rest of the detection points 22 based on the positions of some of the detection points 22 and the predetermined position of the rotation axis 21a.

The association information storage unit 12b stores association information for associating the positions of the plurality of current detection points with the positions of the plurality of previous detection points 22. Here, the positions of the plurality of current detection points and the positions of the plurality of previous detection points 22 will be described.

When the input unit 11a has detected all the detection points 22 currently, the positions of the plurality of current detection points 22 include the positions of all the detection points 22 currently detected by the input unit 11a. On the other hand, when the input unit 11a currently detects some of the detection points 22 and the detection point complement unit 13b currently complements rest of the detection points 22, the positions of the plurality of current detection points 22 include the positions of some of the detection points 22 currently detected by the input unit 11a and the positions of rest of the detection points 22 currently complemented by the detection point complement unit 13b.

Likewise, when the input unit 11a has detected all the detection points 22 previously, the positions of the plurality of previous detection points 22 include the positions of all the detection points 22 previously detected by the input unit 11a. On the other hand, when the input unit 11a previously detects some of the detection points 22 and the detection point complement unit 13b previously complements rest of the detection points 22, the positions of the plurality of previous detection points 22 include the positions of some of the detection points 22 previously detected by the input unit 11a and the positions of rest of the detection points 22 previously complemented by the detection point complement unit 13b.

The association information stored in the association information storage unit 12b includes the positions and identifiers of the plurality of previous detection points 22 and the like.

The association unit 12c associates the positions of the plurality of current detection points 22 with the positions of the plurality of previous detection points 22 using the association information.

Figure 7:
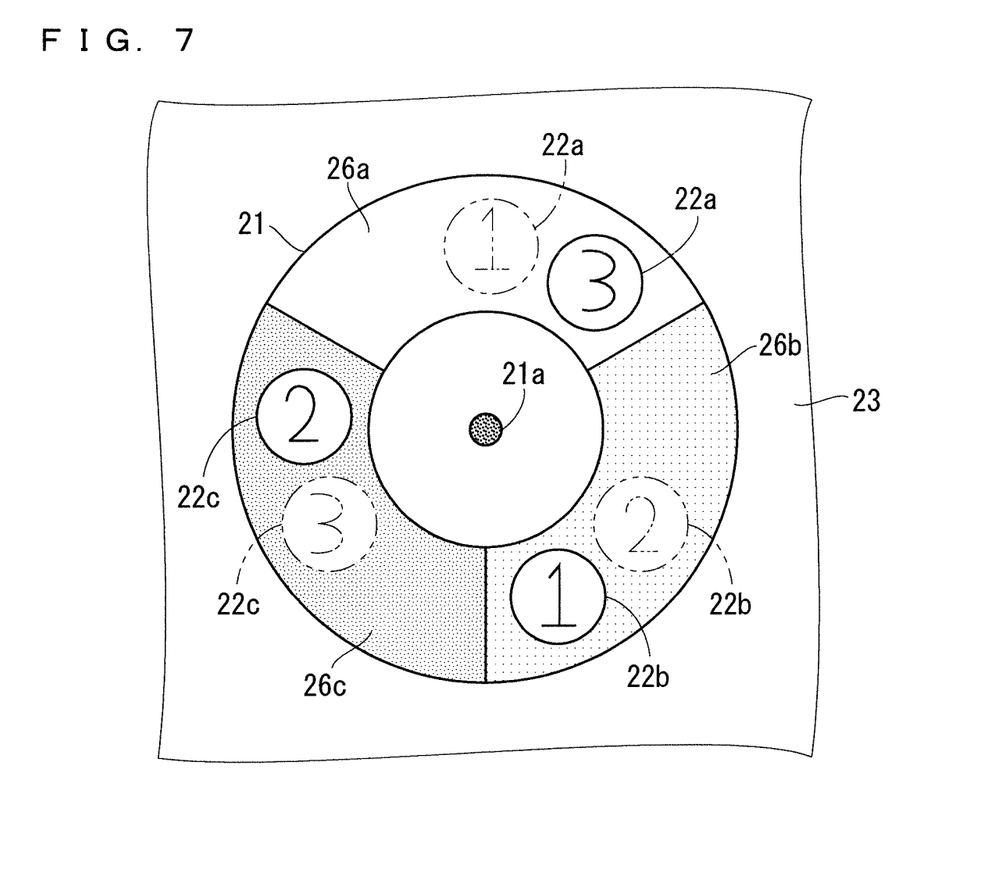
FIG. 7 A plan view for illustrating the association of the rotation detection device according to Embodiment 2.
Figure 8:
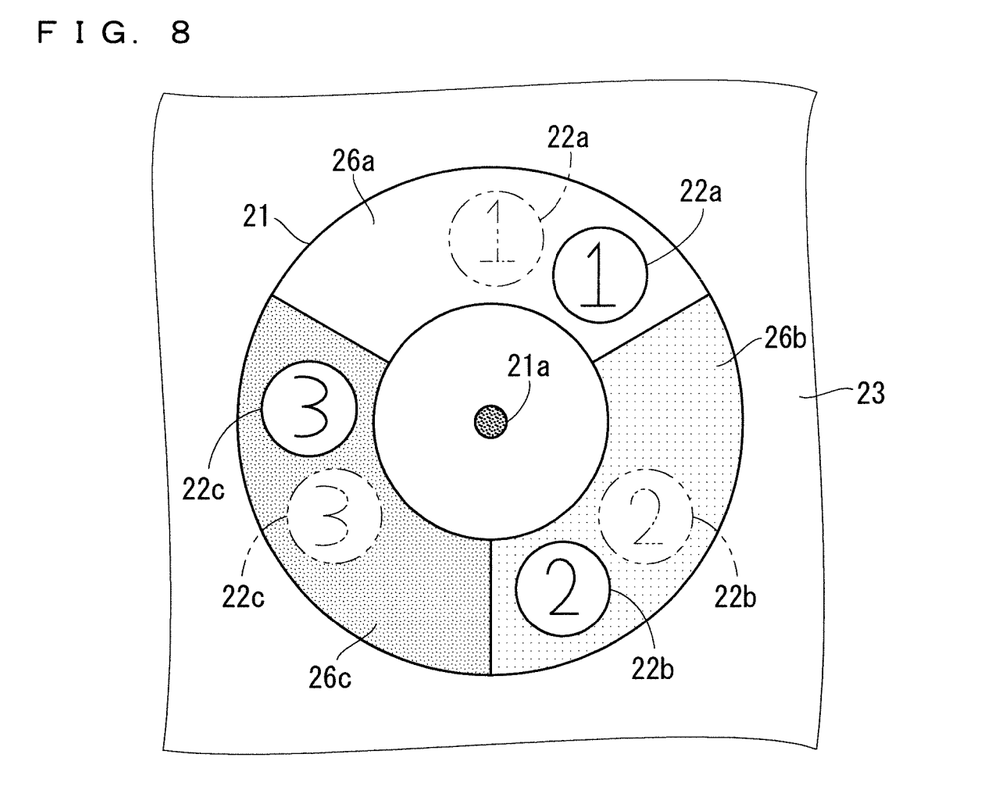
FIG. 8 A plan view for illustrating the association of the rotation detection device according to Embodiment 2.

FIGS. 7 and 8 are plan views for illustrating the association of the association unit 12c according to Embodiment 2. In Embodiment 2, the association unit 12c associates a first detection point group that includes the plurality of previous detection points 22 with a second detection point group that includes the plurality of current detection points 22, located in a plurality of areas respectively set based on the first detection point group.

As illustrated in FIG. 7, the association unit 12c sets a plurality of areas 26 (areas 26a, 26b, 26c) based on the plurality of previous detection points 22 (detection points 22a, 22b, 22c), respectively. In the example of FIG. 7, each area 26 has a central angle of 120°, and the detection point 22 is located at the center of each area 26. However, each area 26 is not limited to the example of FIG. 7, and it only need be an area in which the detection point 22 is movable in the cycle in which the association unit 12c performs the association. For example, the association unit 12c may increase the degree of central angle of each area 26 greater than 120° when the cycle of association is greater than a threshold value, or may reduce the degree of central angle of each area 26 smaller than 120° when the cycle of association is smaller than the threshold value.

After the areas 26a, 26b, and 26c are set, the association unit 12c associates the previous detection points 22a, 22b, and 22c, with the current detection points 22a, 22b, and 22c, located in the areas 26a, 26b, and 26c, respectively. Then, as illustrated in FIG. 8, the association unit 12c provides the current detection points 22a, 22b, and 22c with the same identifiers as the corresponding previous detection points 22a, 22b, and 22c, respectively. With such a configuration, even when the state described in FIGS. 5 and 6 occurs, the identifier of the detection point 22b provided with the identifier "1" in FIG. 6 is to be replaced with the appropriate identifier "2".

The knob rotation detection unit 12a detects the rotation of the knob 21 based on the positions of the plurality of current detection points 22 and the positions of the plurality of previous detection points 22 which are associated with each other by the association unit 12c. In the example of FIG. 8, the knob rotation detection unit 12a obtains, for each identifier, the difference between the respective positions of the previous detection points 22a, 22b, and 22c, and the respective positions of the current detection points 22a, 22b, and 22c, of which identifiers have been replaced and then detects the rotation of the knob 21 based on the difference. This ensures to bring the rotation angle detected by the rotation detection device 1 according to Embodiment 2 closer to the actual rotation angle 31b.

<Operation>

Figure 9:
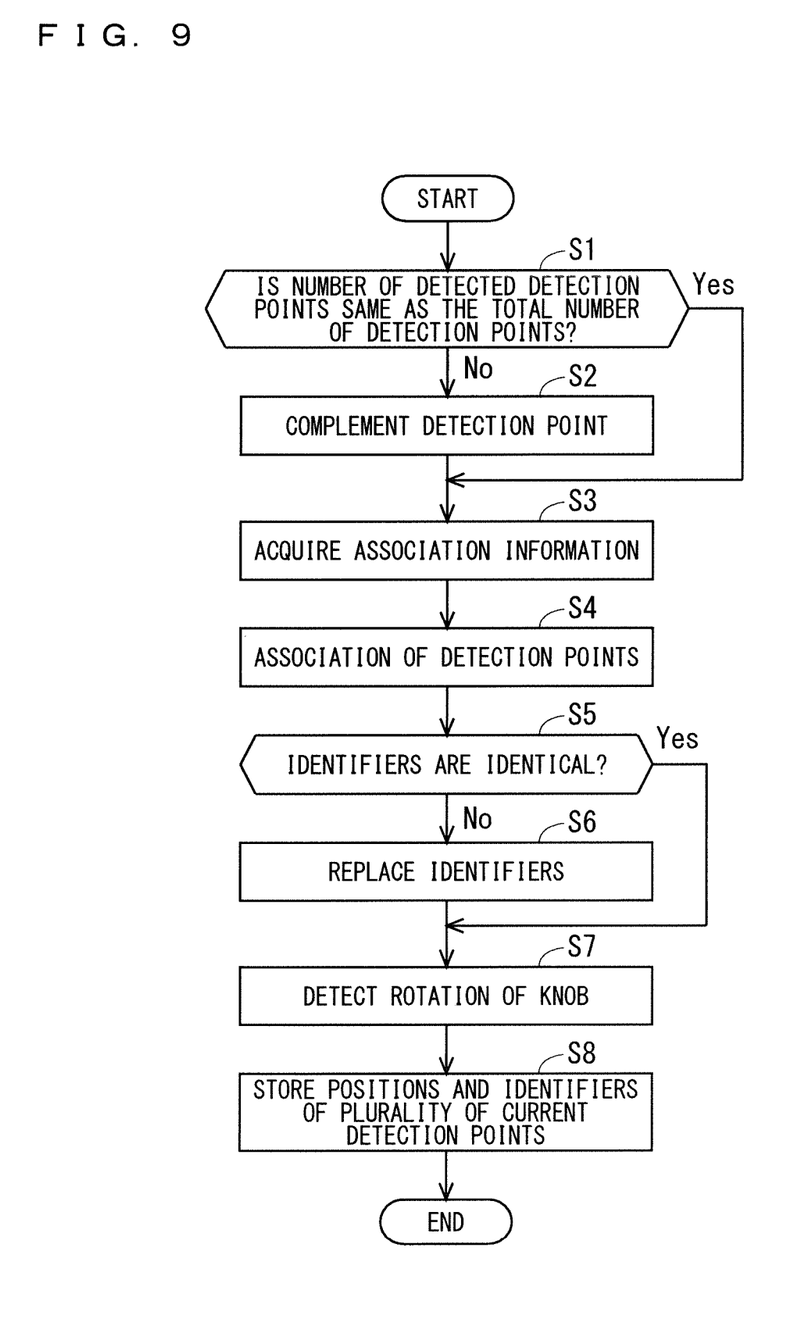
FIG. 9 A flowchart for illustrating the operation of the rotation detection device according to Embodiment 2.

FIG. 9 is a flowchart illustrating the operation of the rotation detection device 1 according to Embodiment 2. The input unit 11a collectively detects the positions of the detection points 22, and the operation of FIG. 9 is performed when the input unit 11a detects one or more detection points 22.

In Step S1, the detection point complement unit 13b determines whether or not the number of detection points 22 detected by the input unit 11a is the same as the total number of detection points 22 provided for the knob 21. When it is determined that the number is the same, the process proceeds to Step S3. When it is determined that the number is not the same, that is, when the number of detected detection points 22 is smaller than the number of detection points 22 of the knob 21, the process proceeds to Step S2.

In Step S2, in accordance with the information stored in the knob information storage unit 13a, the detection point complementing unit 13b complements a position of the rest of detection point 22 based on the positions of some of the detection points 22 detected by the input unit 11a and the predetermined position of the rotation axis 21a. Further, the detection point complement unit 13b provides the rest of detection points 22 with an identifier. In addition, in Step S2, the detection point complement unit 13b may acquire information about the knob 21 from the knob information storage unit 13a, or such information acquisition may be performed only when the device is activated. Thereafter, the process proceeds to Step S3.

In Step S3, the association unit 12c acquires the association information stored in the association information storage unit 12b. As a result, the association unit 12c acquires the positions and identifiers of the plurality of previous detection points 22 and sets the plurality of areas 26 based on the acquired plurality of the previous detection points 22.

In Step S4, the association unit 12c associates the positions of the plurality of current detection points 22 with the positions of the plurality of previous detection points 22 based on the plurality of areas 26.

In Step S5, the association unit 12c determines whether the identifiers of the current detection points 22 are identical to the identifiers of the corresponding previous detection points. When determined that the identifiers are identical, the process proceeds to Step S7, and when determined that the identifiers are non-identical, the process proceeds to Step S6.

In Step S6, the association unit 12c replaces the identifiers of the current detection points 22 with the identifiers of the previous detection points 22 associated in Step S4. As a result, the difference between the current detection points 22 and the previous detection points 22 is more or less minimized in terms of the combination of identifiers. Thereafter, the process proceeds to Step S7.

In Step S7, the knob rotation detection unit 12a obtains the differences between the positions of the plurality of previous detection points 22 and the positions of the plurality of current detection points 22 for each identifier and detects the rotation of the knob 21 based on the differences. As a result, the knob rotation detection unit 12a detects the rotation of the knob 21 based on the positions of the plurality of current detection points 22 and the positions of the plurality of previous detection points 22 which are associated with each other by the association unit 12c.

In Step S8, the knob rotation detection unit 12a stores the positions and identifiers of the plurality of current detection points 22 used in Step S7 in the association information storage unit 12b as the positions and identifiers of the plurality of previous detection points 22. Then, the operation of FIG. 9 ends.

Conclusion of Embodiment 2

According to the above rotation detection device 1 of Embodiment 2, the first detection point group is associated with the second detection point group located in the plurality of areas respectively set based on the first detection point group. With such a configuration, the rotation angle detected by the knob rotation detection unit 12a can be brought closer to the actual rotation angle, so that the detection accuracy of the rotation of the knob 21 can further be enhanced.

In the above description, the first detection point group is the plurality of previous detection points 22 indicated by chain double-dashed line in FIGS. 7 and 8, and the second detection point group is the plurality of current detection points 22 indicated by solid line in FIGS. 7 and 8. However, the relationship is not limited thereto, and the reversed relationship may also be adopted. That is, the first detection point group may be the plurality of current detection points 22 indicated by solid line in FIGS. 7 and 8, and the second detection point group may be the plurality of previous detection points 22 indicated by chain double-dashed line in FIGS. 7 and 8.

Further, in the above description, the knob rotation detection unit 12a detects the rotation of the knob 21 based on the positions and identifiers of the plurality of current detection points 22 and the positions and identifiers of the plurality of past detection points 22. And, the positions and identifiers of the plurality of past detection points 22 are the positions and identifiers of the plurality of detection points 22 at one point of time in the past. However, the positions and identifiers of the plurality of past detection points 22 used for the detection by the knob rotation detection unit 12a are not limited thereto, and for example, the positions and identifiers of the plurality of past detection points 22 at a plurality of points of time in the past, that is, the history of the positions and the identifiers of the plurality of detection points 22 may also be adoptable.

Embodiment 3

The block configuration of the rotation detection device 1 according to Embodiment 3 of the present invention is the same as the block configuration of the rotation detection device 1 according to Embodiment 2 (FIG. 4). Hereinafter, of the components according to Embodiment 3, the same or similar reference numerals are given to the same or similar components as those described above, and different components will be mainly described.

In FIG. 7 of Embodiment 2, the detection point 22 is located at the center of each area 26. However, at the position of the detection points 22 as illustrated in FIG. 7, detection points 22 that are not supposed to be missed out in the areas 26 may possibly be missed out in the areas 26 depending on the detection cycle of the touch panel 23 or the speed of the rotating operation on the knob 21. As a result, the rotation of the knob 21 may not possibly be appropriately detected.

Figure 10:
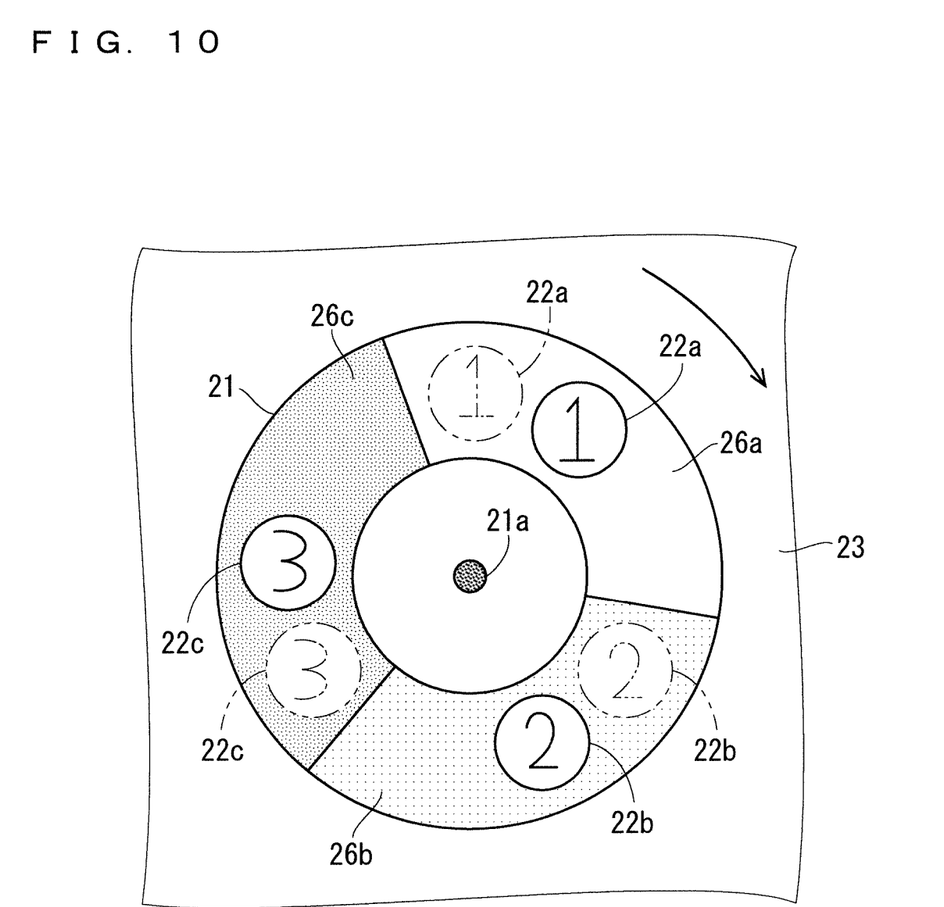
FIG. 10 A plan view for illustrating the correction by the rotation detection device according to Embodiment 3.

Therefore, in Embodiment 3, the knob rotation detection unit 12a detects, as the rotation of the knob 21, the rotation direction of the knob 21 or the rotation direction and the rotation angle of the knob 21, and the association unit 12c corrects the plurality of areas 26 based on the rotation of the knob 21 detected by the knob rotation detection unit 12a. For example, when the knob rotation detection unit 12a detects a clockwise direction as the rotation direction of the knob 21, the association unit 12c corrects the positions of the areas 26 in FIG. 7 to be the positions of the areas 26 as illustrated in FIG. 10. That is, in this case, the correction is performed by shifting the areas 26 in the clockwise direction with respect to the detection points 22 serving as references.

When the knob rotation detection unit 12a is configured to detect the rotation angle of the knob 21 as the rotation of the knob 21, the association unit 12c may increase a shift amount of the area 26 as the rotation angle detected by the knob rotation detection unit 12a becomes larger. In the following description, the knob rotation detection unit 12a detects the rotation direction and the rotation angle of the knob 21 as the rotation of the knob 21, and the association unit 12c corrects the plurality of areas 26 based on the rotation direction and the rotation angle detected by the knob rotation detection unit 12a.

<Operation>

Figure 11:
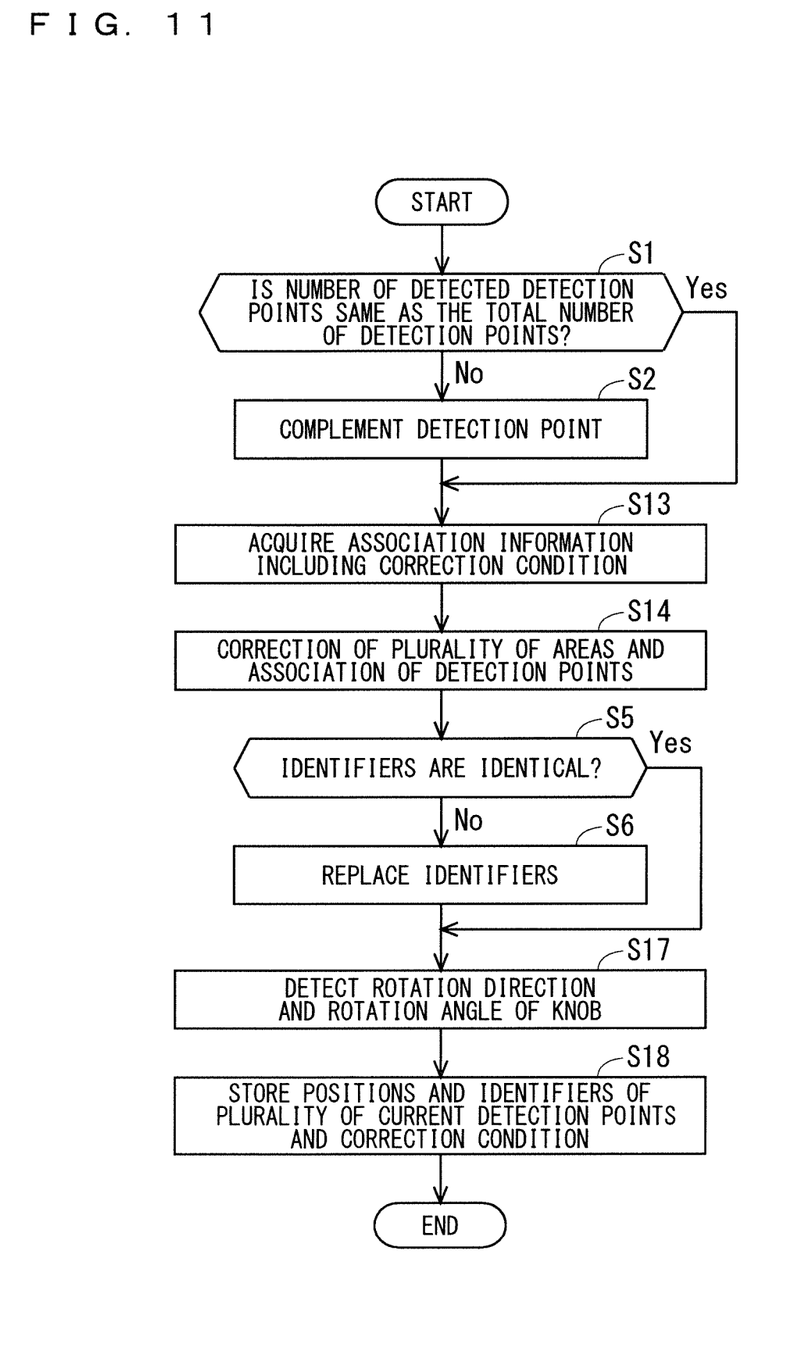
FIG. 11 A flowchart for illustrating the operation of the rotation detection device according to Embodiment 3.

FIG. 11 is a flowchart illustrating the operation of the rotation detection device 1 according to Embodiment 3. The flowchart of FIG. 11 is similar to the flowchart in which the Steps S3, S4, S7, and S8 in the flowchart of FIG. 9 are changed to Steps S13, S14, S17, and S18, respectively. Hereinafter, Steps S13, S14, S17, and S18 will mainly be described.

In Step S13, the association unit 12c acquires the association information stored in the association information storage unit 12b. In Embodiment 3, the association information further includes, as the correction condition, the rotation direction and the rotation angle previously detected by the knob rotation detection unit 12a. Therefore, in Step S13, the association unit 12c acquires the correction condition in addition to the positions and identifiers of the plurality of previous detection points 22.

In Step S14, the association unit 12c corrects the plurality of areas 26 based on the correction condition and associates the positions of the plurality of current detection points 22 with the positions of the plurality of previous detection points 22 based on the plurality of areas 26.

After Steps S5 and the like, in Step S17, the knob rotation detection unit 12a detects the rotation direction and the rotation angle of the knob 21 based on the positions of the plurality of current detection points 22 and the positions of the plurality of previous detection points 22 which are associated with each other by the association unit 12c.

In Step S18, the knob rotation detection unit 12a stores the positions and identifiers of the plurality of current detection points 22 used in Step S17 in the association information storage unit 12b as the positions and identifiers of the plurality of previous detection points 22. Further, the association unit 12c updates the correction condition with the rotation direction and the rotation angle currently detected by the knob rotation detection unit 12a, and stores the updated correction condition in the association information storage unit 12b. Then, the operation of FIG. 11 ends.

Conclusion of Embodiment 3

The rotation detection device 1 according to Embodiment 3 as described above corrects the plurality of areas 26 based on the detected rotation of the knob 21. With such a configuration, the detection accuracy of the rotation of the knob 21 is further enhanced.

In the above description, the association unit 12c corrects the plurality of areas 26 based on the rotation direction and the rotation angle detected by the knob rotation detection unit 12a. And the rotation direction and the rotation angle detected by the knob rotation detection unit 12a are the rotation direction and the rotation angle detected at one point of time in the past. However, the rotation direction and the rotation angle used for the correction by the association unit 12c are not limited thereto, and for example, the rotation directions and the rotation angles detected at a plurality of points of time in the past, that is, the history of the rotation directions and the rotation angles may also be adaptable.

Further, the association unit 12c may cancel the correction of the plurality of areas 26 when the rotation direction detected by the knob rotation detection unit 12a is reversed from the rotation direction detected earlier than the rotation direction is detected. For example, in the state of FIG. 10, when the knob rotation detection unit 12a detects a counterclockwise direction as the rotation direction of the knob 21, the association unit 12c may restore the state of FIG. 7 by cancelling the correction for shifting the areas 26 in the clockwise direction with respect to the detection points 22.

Embodiment 4

The block configuration of the rotation detection device 1 according to Embodiment 4 of the present invention is the same as the block configuration of the rotation detection device 1 according to Embodiment 2 (FIG. 4). Hereinafter, of the components according to Embodiment 4, the same or similar reference numerals are given to the same or similar components as those described above, and different components will be mainly described.

In Embodiment 2, the association unit 12c associates the positions of the plurality of current detection points 22 with the positions of the plurality of previous detection points 22 using the plurality of areas 26 (FIG. 7). However, the association is not limited thereto. In Embodiment 4, based on the distances between the plurality of current detection points 22 and the plurality of previous detection points 22, the association unit 12c associates the plurality of current detection points 22 and the plurality of previous detection points 22, respectively. Specifically, the association unit 12c associates the plurality of current detection points 22 and the plurality of previous detection points 22, respectively, such that the distances between the plurality of current detection points 22 and the plurality of previous detection points 22 are minimized. Even with such a configuration, the detection accuracy of the rotation of the knob 21 is enhanced to some extent.

<Other Modification>

The position detection unit 11, the rotation detection unit 12, and the complement unit 13 in FIG. 1 described above are hereinafter referred to as "position detecting unit 11 and the like". The position detection unit 11 and the like are realized by the processing circuit 81 illustrated in FIG. 12. That is, the processing circuit 81 includes the position detection unit 11 that detects the positions of the plurality of detection points 22 on the touch panel 23, the rotation detection unit 12 that detects the rotation of the knob 21 based on the positions of the plurality of detection points 22 detected by the position detection unit 11, and the complement unit 13 that complements the positions of the rest of the detection points 22 used for the detection of the rotation detection unit 12 based on the positions of some of the detection points 22 and the predetermined position of the rotation axis 21a when the position detection unit 11 detects only the positions of some of the detection points 22 among the plurality of detection points 22. Dedicated hardware may be applied to the processing circuit 81, or a processor that executes a program stored in the memory may be applied. For example, the processor corresponds to a central processing unit, a processing unit, an arithmetic unit, a microprocessor, a microcomputer, a Digital Signal Processor (DSP), or the like.

Figure 12:
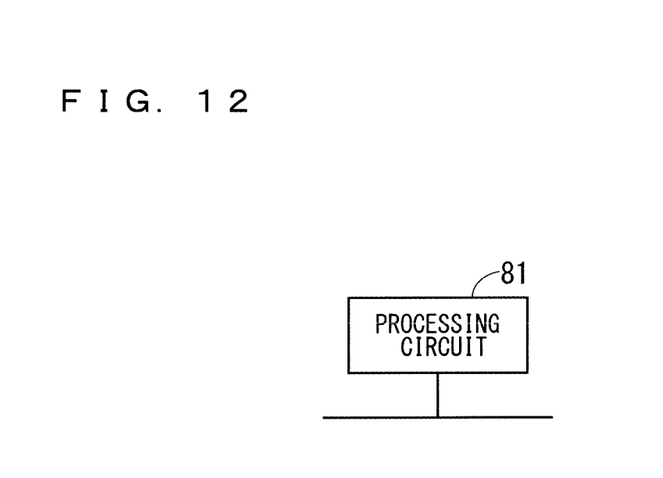
FIG. 12 A block diagram illustrating a hardware configuration of a rotation detection device according to another Modification.

When the dedicated hardware is applied to the processing circuit 81, the processing circuit 81 corresponds to a single circuit, a composite circuit, a programmed processor, a parallel programmed processor, an Application Specific Integrated Circuit (ASIC), or a Field-Programmable Gate Array (FPGA), or the combination thereof. Each of the functions of the position detection unit 11 and the like may be realized by each divided processing circuit of the processing circuit, or may be realized by one processing circuit with each of the functions of the respective parts are integrated.

Figure 13:
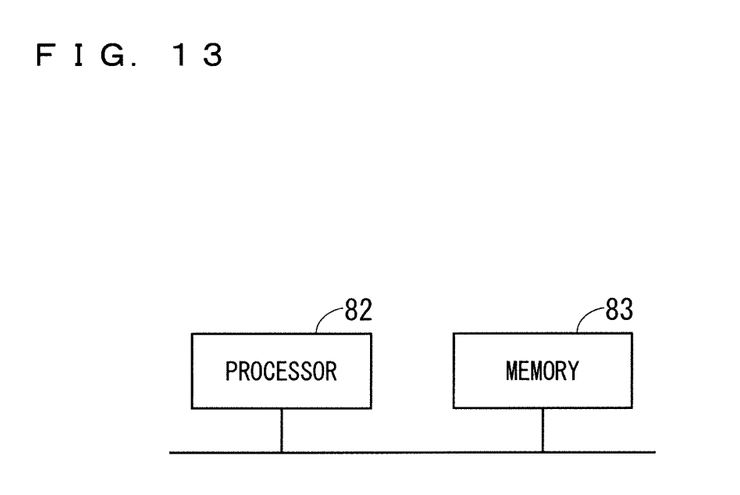
FIG. 13 A block diagram illustrating a hardware configuration of a rotation detection device according to another Modification.

When the processing circuit 81 is a processor, the functions of the position detection unit 11 and the like are realized by a combination with software or the like. Note that the software or the like corresponds to, for example, software, firmware, or software and firmware. The software or the like is described as a program and stored in a memory. As illustrated in FIG. 13, a processor 82 applied to the processing circuit 81 implements the functions of the respective units by reading out and executing the program stored in a memory 83. That is, the rotation detection device 1 includes the memory 83 for storing the program which, eventually, executes a step of detecting the positions of the plurality of detection points 22 on the touch panel 23, a step of detecting the rotation of the knob 21 based on the detected positions of the plurality of detection points 22, and a step of complementing the positions of the rest of the detection points 22 used for the detection of the rotation of the knob 21 based on the positions of some of the detection points 22 and the predetermined position of the rotation axis 21a when only the positions of some of the detection points 22 among the plurality of detection points 22 are detected. In other words, it can be said that the program causes a computer to execute the procedure and method of the position detection unit 11 and the like. Here, the memory 83 may be, for example, a non-volatile or volatile semiconductor memory, such as a random access memory (RAM), a read only memory (ROM), a flash memory, an erasable programmable read only memory (EPROM), an electrically erasable programmable read only memory (EEPROM), or the like, a hard disk drive (HDD), a magnetic disk, a flexible disk, an optical disk, a compact disk, a mini disk, a digital versatile disc (DVD) and a drive device therefor, or any storage medium used in the future.

The configuration in which each function of the position detection unit 11 or the like is realized by either hardware or software has been described above. However, the present invention is not limited thereto, and a configuration in which part of the position detection unit 11 or the like is realized by dedicated hardware and another part is realized by software or the like may be adoptable. For example, the function of the position detection unit 11 is realized by a processing circuit as dedicated hardware, an interface, and a receiver and other functions are realized by the processing circuit 81 as the processor 82 reading and executing the program stored in the memory 83.

As described above, the processing circuit 81 can realize the functions described above by hardware, software, or the like, or a combination thereof.

It should be noted that Embodiments and Modification of the present invention can be arbitrarily combined and can be appropriately modified or omitted without departing from the scope of the invention.

While the invention has been described in detail, the forgoing description is in all aspects illustrative and not restrictive. It is understood that numerous other modifications and variations can be devised without departing from the scope of the invention.

EXPLANATION OF REFERENCE SIGNS 1 rotation detection device, 11 position detection unit, 12 rotation detection unit, 13 complement unit, 21 knob, 21a rotation axis, 22, 22a, 22b, 22c detection point, 23 touch panel, 26, 26a, 26b 26c area.

The invention claimed is:

1. A rotation detection device configured to detect rotation of a knob rotatable about a rotation axis, wherein
the knob includes a plurality of detection points separated from the rotation axis, and
the knob is capable of being disposed with the rotation axis positioned at a predetermined position on the touch panel,
the rotation detection device comprising:
a position detector configured to detect positions of the plurality of detection points on the touch panel;
a rotation detector configured to detect the rotation of the knob based on the positions of the plurality of detection points detected by the position detector; and
a processing circuitry configured to complement the positions of rest of the detection points used for detection of the rotation detector based on the positions of some of the detection points and the predetermined position of the rotation axis when the position detector detects only the positions of some of the detection points among the plurality of detection points.

2. The rotation detection device according to claim 1, wherein
the processing circuitry is further configured to store information of the knob including a predetermined positional relationship between the rotational axis of the knob and the plurality of detection points, and complements the positions of rest of the detection points used for detection of the rotation detector based on the stored information of the knob when the position detector detects only the positions of some of the detection points among the plurality of detection points.

3. A rotation detection device configured to detect rotation of a knob rotatable about a rotation axis, wherein
the knob includes a plurality of detection points separated from the rotation axis, and
the knob is capable of being disposed with the rotation axis positioned at a predetermined position on the touch panel,
the rotation detection device comprising:
a position detector configured to detect positions of the plurality of detection points on the touch panel;
a rotation detector configured to detect the rotation of the knob based on the positions of the plurality of detection points detected by the position detector; and
a processing circuitry configured to complement the positions of rest of the detection points used for detection of the rotation detector based on the positions of some of the detection points and the predetermined position of the rotation axis when the position detector detects only the positions of some of the detection points among the plurality of detection points, wherein
the rotation detector is configured to associate positions of a plurality of current detection points including the positions of some of the detection points detected by the position detector and the positions of the rest of the detection points complemented by the processing circuitry with positions of a plurality of previous detection points, and detect the rotation of the knob based on the positions of the plurality of current detection points and the positions of the plurality of previous detection points, which are associated with each other.

4. The rotation detection device according to claim 3, wherein the rotation detector is configured to associate a first detection point group that includes one of the plurality of current detection points and the plurality of previous detection points with a second detection point group that includes another one of the plurality of current detection points and the plurality of previous detection points, located in a plurality of areas respectively set based on the first detection point group.

5. The rotation detection device according to claim 4, wherein the rotation detector is configured to detect a rotation direction of the knob or the rotation direction and a rotation angle of the knob as the rotation of the knob, and the rotation detector is configured to correct the plurality of areas based on the detected rotation of the knob.

6. The rotation detection device according to claim 5, wherein the rotation detector is configured to cancel correction of the plurality of areas when the rotation direction is reversed from the rotation direction detected earlier than the rotation direction is detected.

7. The rotation detection device according to claim 3, wherein the rotation detector is configured to associate the plurality of current detection points with the plurality of previous detection points, respectively, based on distances between the plurality of current detection points and the plurality of previous detection points.

8. A rotation detection method of detecting rotation of a knob rotatable about a rotation axis, wherein the knob includes a plurality of detection points separated from the rotation axis, and the knob is capable of being disposed with the rotation axis positioned at a predetermined position on the touch panel, the rotation detection method comprising:

detecting positions of the plurality of detection points on the touch panel;

detecting the rotation of the knob based on the detected positions of the plurality of detection points; and complementing the positions of rest of the detection points used for detection of the rotation of the knob based on the positions of some of the detection points and the predetermined position of the rotation axis when only the positions of some of the detection points among the plurality of detection points are detected.

9. The rotation detection method according to claim 8, wherein the rotation detection method further comprises:

storing information of the knob including a predetermined positional relationship between the rotational axis of the knob and the plurality of detection points, and wherein, the complementing step includes the step of, complementing the positions of rest of the detection points used for detection of the rotation of the knob based on the stored information of the knob when only the positions of some of the detection points among the plurality of detection points are detected.

10. The rotation detection method according to claim 8, further comprising:

associating positions of a plurality of current detection points including the positions of some of the detection points detected and the positions of the rest of the detection points complemented, with positions of a plurality of previous detection points, and detecting the rotation of the knob based on the positions of the plurality of current detection points and the positions of the plurality of previous detection points, which are associated with each other.

* * * * *